US012485057B1

(12) United States Patent
Pepe

(10) Patent No.: US 12,485,057 B1
(45) Date of Patent: Dec. 2, 2025

(54) LYMPHEDEMA COMPRESSION SLEEVE APPARATUS AND SYSTEM

(71) Applicant: Desmond J. Pepe, Atlantic Highlands, NJ (US)

(72) Inventor: Desmond J. Pepe, Atlantic Highlands, NJ (US)

(*) Notice: Subject to any disclaimer, the term of this patent is extended or adjusted under 35 U.S.C. 154(b) by 0 days.

(21) Appl. No.: 18/819,128

(22) Filed: Aug. 29, 2024

(51) Int. Cl.
*A61H 9/00* (2006.01)

(52) U.S. Cl.
CPC ......... *A61H 9/0007* (2013.01); *A61H 9/0092* (2013.01); *A61H 2201/1215* (2013.01); *A61H 2201/149* (2013.01); *A61H 2201/5002* (2013.01); *A61H 2201/5043* (2013.01); *A61H 2201/5097* (2013.01); *A61H 2209/00* (2013.01)

(58) Field of Classification Search
CPC ............................ A61H 11/00; A61H 2209/00
See application file for complete search history.

(56) References Cited

U.S. PATENT DOCUMENTS 6,179,796 B1 1/2001 Waldridge
6,254,554 B1 7/2001 Turtzo
6,315,745 B1 11/2001 Kloecker
6,860,862 B2 3/2005 Waldridge et al.
11,865,059 B2 1/2024 Wyatt et al.
2008/0319359 A1* 12/2008 Moomiaie-Qajar ... A61H 11/00 601/152
2009/0118651 A1* 5/2009 Rousso .................. A61H 11/00 601/134
2016/0331620 A1* 11/2016 Kazanchyan ...... A61N 1/36003
2020/0268592 A1* 8/2020 Johnson ............... A61H 9/0057

(Continued)

FOREIGN PATENT DOCUMENTS

WO WO-2014168624 A1 * 10/2014 ............... A61D 9/00

OTHER PUBLICATIONS

CircAid Foam Compression Sleeve. "Lymphedema maintenance simplified with new foam sleeve." News release, Jun. 28, 2021. Medi USA, Whitsett, NC. https://www.mediusa.com/lymphedema-maintenance-simplified-with-new-foam-sleeve/.

(Continued)

*Primary Examiner* — Margaret M Luarca
*Assistant Examiner* — Sarah B Lederer
(74) *Attorney, Agent, or Firm* — Gregory Finch; Finch Paolino, LLC

(57) ABSTRACT

A lymphedema compression sleeve apparatus and system. Embodiments of the present disclosure provide for a compression sleeve apparatus configured to apply variable pressure to a user's arm or leg via the use of a plurality of electric motors and wires/filaments disposed along a length of the compression sleeve apparatus. The plurality of electric motors may each comprise a shaft configured to drive one or more means for gathering a length of the wires/filaments in order to shorten the wires/filaments. The wires/filaments may be circumferentially disposed around the user's arm or leg when the compression sleeve apparatus is worn by the user. The action of shortening the wires/filaments via the electric motors creates pressure on the surface of the user's arm or leg to treat lymphedema symptoms. The plurality of electric motors may be engaged in a sequence to create a peristaltic action along the length of the compression sleeve.

15 Claims, 10 Drawing Sheets

(56) References Cited

U.S. PATENT DOCUMENTS

| | | | | |
|---|---|---|---|---|
| 2022/0125666 | A1 | 4/2022 | Gilbert et al. | |
| 2022/0211576 | A1* | 7/2022 | Carroll | A61H 23/04 |

OTHER PUBLICATIONS

Juzo Lymphedema Compression Sleeve Viewed online Feb. 24, 2025 at https://juzousa.com/Products/Arm-Sleeves-for-Lymphedema. Julius Zorn, Inc. Cuyahoga Falls, OH.

Suehiro, K., et al. "A Novel Arm Sleeve for Upper Extremity Lymphedema: A Pilot Study." Annals of Vascular Diseases, 7(2), 134-140. 2014.

Rahimi, M., et al."Motorized adaptive compression system for enhancing venous return: A feasibility study on healthy individuals." Abstract and summary. Medical Engineering & Physics, vol. 50, 65-74. Dec. 2017. Viewed at https://www.sciencedirect.com/science/article/abs/pii/S1350453317302606.

* cited by examiner

LYMPHEDEMA COMPRESSION SLEEVE APPARATUS AND SYSTEM

FIELD

The present disclosure relates to the field of lymphedema compression sleeves; in particular, a lymphedema compression sleeve apparatus and system comprising a variable pressure means and a peristaltic action means.

BACKGROUND

Compression sleeves and garments for lymphedema can help reduce pain and swelling by moving accumulated fluids away from the affected area (e.g., a person's extremities). Lymphedema sleeves and other compression garments are typically made of stretchy fabric that exerts pressure on the surface of a person's extremity when worn. This pressure helps drain the excess lymph that has accumulated in said areas. In general, there are two types of compression sleeves: daytime and nighttime lymphedema sleeves. Daytime lymphedema sleeves are typically configured to exert less pressure than nighttime lymphedema sleeves. Lymphedema compression sleeves are available off-the-shelf (i.e., ready-to-wear) or custom-made to a patient's measurements and functional specification (e.g., desired pressure). They come in a number of different styles and materials. Some daytime lymphedema sleeves also come with a glove or gauntlet already attached. Lymphedema sleeves come in different classes that are configured to exert different levels of pressure to the user's extremity. For example, in the United States, there are four pressure levels for lymphedema sleeves including class 1 sleeves, which are configured to exert 20 mmHg to 30 mmHg of pressure; class 2 sleeves, which are configured to exert 30 mmHg to 40 mmHg of pressure; class 3 sleeves, which are configured to exert 40 mmHg to 50 mmHg of pressure; and class 4 sleeves, which are configured to exert 50 mmHg to 60 mmHg of pressure.

Due to the wide variety of arm sizes of users, and the variability of arm sizes caused by lymphedema symptoms, it is often difficult for users to find suitable off-the-shelf lymphedema sleeves—thereby requiring more expensive custom solutions. Additionally, since lymphedema symptoms can vary in severity over time, a user may also need multiple different classes of sleeves to treat their symptoms over time. This can also increase the cost of effective lymphedema treatment.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a compression sleeve apparatus comprising a sleeve comprising a fabric material, the sleeve being configured to be worn on an extremity of a user's body; a plurality of motors disposed along a length of the sleeve between a first end and a second end of the sleeve; a plurality of filaments disposed around a circumference of the sleeve, wherein each filament in the plurality of filaments is operably engaged with each motor in the plurality of motors, wherein each motor in the plurality of motors is configured to wind each filament around an axis of a shaft when each motor in the plurality of motors is engaged in a first direction and unwind each filament from around the axis of the shaft when each motor in the plurality of motors is engaged in a second direction; a controller operably engaged with the plurality of motors via at least one bus, wherein the controller is operably configured to selectively engage each motor in the plurality of motors in the first direction and the second direction; and a power source operably engaged with the controller and the plurality of motors to provide a flow of power to the controller and the plurality of motors.

In accordance with certain embodiments of the compression sleeve apparatus, the controller may be operably configured to selectively engage each motor in the plurality of motors in a sequence. In certain embodiments, the sequence comprises a peristaltic wave sequence between the first end of the sleeve and the second end of the sleeve. In certain embodiments, the controller may be operably configured to selectively engage each motor in the plurality of motors according to two or more pressure controls for winding each filament in the plurality of filaments around the axis of the shaft. In said embodiments, the compression sleeve apparatus may further comprise a plurality of pressure sensors communicably engaged with the controller to provide at least one pressure measurement for the plurality of filaments. In certain embodiments, each filament in the plurality of filaments is configured to apply radial pressure to a surface of the sleeve in response to being wound around the axis of the shaft. In said embodiments, each filament in the plurality of filaments is configured to release the radial pressure from the surface of the sleeve in response to being unwound from around the axis of the shaft.

Further aspects of the present disclosure provide for a compression sleeve apparatus comprising a sleeve comprising a fabric material, the sleeve being configured to be worn on an extremity of a user's body; a plurality of motors disposed along a length of the sleeve between a first end and a second end of the sleeve; a plurality of filaments disposed around a circumference of the sleeve, wherein each filament in the plurality of filaments is operably engaged with each motor in the plurality of motors, wherein each motor in the plurality of motors is configured to wind each filament around an axis of a shaft when each motor in the plurality of motors is engaged in a first direction and unwind each filament from around the axis of the shaft when each motor in the plurality of motors is engaged in a second direction; a controller operably engaged with the plurality of motors via at least one bus, wherein the controller is operably configured to selectively engage each motor in the plurality of motors in the first direction and the second direction; a power source operably engaged with the controller and the plurality of motors to provide a flow of power to the controller and the plurality of motors; and a user interface operably engaged with the controller, wherein the user interface is configured to command one or more operational modes of the controller.

In accordance with certain embodiments of the compression sleeve apparatus, the one or more operational modes of the controller may comprise one or more sequence for engaging each motor in the plurality of motors. In certain embodiments, the one or more operational modes of the controller may comprise one or more pressure setting for each motor in the plurality of motors.

Still further aspects of the present disclosure provide for a compression sleeve system comprising a compression sleeve apparatus and an external electronic device communicably engaged with a controller of the compression sleeve apparatus via a wireless communications interface. In accordance with certain aspects of the present disclosure, the compression sleeve apparatus comprises a sleeve comprising a fabric material, the sleeve being configured to be worn on an extremity of a user's body; a plurality of motors disposed along a length of the sleeve between a first end and a second end of the sleeve; a plurality of filaments disposed around a circumference of the sleeve, wherein each filament in the plurality of filaments is operably engaged with each motor in the plurality of motors, wherein each motor in the plurality of motors is configured to wind each filament around an axis of a shaft when each motor in the plurality of motors is engaged in a first direction and unwind each filament from around the axis of the shaft when each motor in the plurality of motors is engaged in a second direction; a controller operably engaged with the plurality of motors via at least one bus, wherein the controller is operably configured to selectively engage each motor in the plurality of motors in the first direction and the second direction; and a power source operably engaged with the controller and the plurality of motors to provide a flow of power to the controller and the plurality of motors.

In accordance with certain embodiments of the compression sleeve, the external electronic device comprises a user interface for commanding one or more operational modes of the controller. In certain embodiments, the one or more operational modes of the controller may comprise one or more sequence for engaging each motor in the plurality of motors. The one or more sequence may comprise a peristaltic wave sequence between the first end of the sleeve and the second end of the sleeve. In certain embodiments, the one or more operational modes of the controller may comprise one or more pressure setting for each motor in the plurality of motors. In certain embodiments, the one or more operational modes of the controller may comprise one or more timing parameters for engaging each motor in the plurality of motors. In certain embodiments, the controller is configured to communicate real-time activity data for the compression sleeve apparatus to the external electronic device via the wireless communications interface. The external electronic device may be configured to display the real-time activity data at the user interface.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and apparatus may be better understood from the following illustrative description with reference to the following drawings in which.

DETAILED DESCRIPTION

Figure 1:
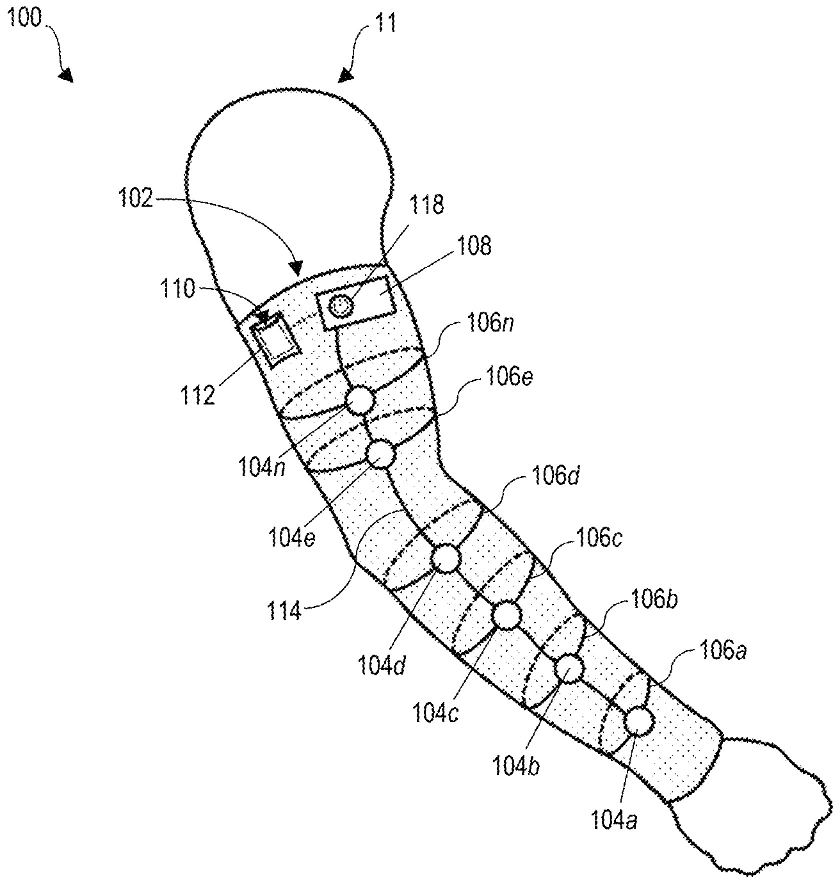
FIG. 1 is a diagram of a lymphedema compression sleeve apparatus, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for a novel and improved compression sleeve for treatment of patients with lymphedema. In accordance with certain aspects of the present disclosure, the novel and improved compression sleeve comprises a plurality of electric motors disposed on a surface of the compression sleeve. The compression sleeve may further comprise a plurality of wires or filaments. Each wire or filament in the plurality of wires or filaments may be wrapped around a circumference of the compression sleeve at a location of each electric motor in the plurality of electric motors. Each electric motor may comprise a motor housing in which at least one end of the wire or filament may be housed. The electric motor may be configured to wind the end of the wire or filament around a spool or other means for gathering a length of the wire or filament in order to shorten the length of the wire or filament. When the compression sleeve is worn by a user, the shortening of the length of the wire or filament (e.g., via winding the end of the wire or filament around a spool or other gathering means) results in the wire or filament applying radial pressure to the arm of the user. This radial pressure can help reduce pain and swelling in the user by moving accumulated lymphatic fluids away from the adjacent area.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "filament" refers to any slender threadlike object or fiber including, but not limited to, wire, string, monofilament line and the like.

As used herein, the term "extremity" refers to an arm or leg on the human body.

Embodiments of the present disclosure provide for a compression sleeve apparatus configured to apply variable pressure to a user's arm or leg via the use of a plurality of electric motors and wires/filaments disposed along a length of the compression sleeve apparatus. The plurality of electric motors may each comprise a shaft configured to drive one or more means for gathering a length of the wires/filaments in order to shorten the wires/filaments. The wires/filaments may be circumferentially disposed around the user's arm or leg when the compression sleeve apparatus is worn by the user. The action of shortening the wires/filaments via the electric motors creates pressure on the surface of the user's arm or leg to treat lymphedema symptoms. The plurality of electric motors may be engaged in a sequence to create a peristaltic action along the length of the compression sleeve.

Certain benefits and advantages of the present disclosure include a lymphedema compression sleeve that provides a peristaltic action along the length of the compression sleeve to improve the flow of fluids from an extremity of a user.

Certain benefits and advantages of the present disclosure include a lymphedema compression sleeve that is configured to exert variable pressure to the user's extremity. In accordance with certain aspects of the present disclosure, the variable pressure is selectively configurable via at least one user interface.

Certain benefits and advantages of the present disclosure include a lymphedema compression sleeve that is configured to exert a graded pressure to the user's extremity (e.g., wherein the pressure is greater at a distal portion of the user's extremity and lighter at a proximal portion of the user's extremity). In accordance with certain aspects of the present disclosure, the variable pressure is selectively configurable via at least one user interface.

Certain benefits and advantages of the present disclosure include a lymphedema compression sleeve that accommodates a wide range of user sizes in a single device. In accordance with certain aspects of the present disclosure, the wide range of user sizes is achieved via an adjustable length of a plurality of filaments.

Turning now descriptively to the drawings, in which similar reference characters denote similar elements throughout the several views, FIG. 1 depicts a diagram of a lymphedema compression sleeve apparatus 100. In accordance with certain aspects of the present disclosure, apparatus 100 may comprise a sleeve 102, a plurality of motor units 104*a-n* disposed on a surface of sleeve 102 and a plurality of filaments 106*a-n* disposed around a circumference of sleeve 102 and operably engaged with the plurality of motor units 104*a-n*. Sleeve 102 may be constructed of a fabric material. In certain embodiments, sleeve 102 is constructed of a compression fabric comprising a blend of a stretchable fiber, such as spandex, and one or more other fiber selected for performance or comfort, such as cotton, polyester, nylon and the like. In accordance with certain aspects of the present disclosure, motor units 104*a-n* may each comprise a DC motor housed inside a housing. In certain embodiments, the DC motor may comprise a coreless DC motor to reduce size and weight of motor units 104*a-n* (e.g., as compared to a convention DC motor with an iron core). In an exemplary embodiment, motor units 104*a-n* comprise a bi-directional DC motor configured to be engaged in a first direction of rotation (i.e., a forward direction) and a second direction of rotation (i.e., a reverse direction). In accordance with certain embodiments, apparatus 100 may further comprise a controller 108 that is operably engaged with motor units 104*a-n* via a bus 114 (e.g., to command/control one or more operations of motor units 104*a-n*). Controller 108 may comprise a user interface 118 configured to command one or more operations for controller 108. Bus 114 may be sewn into the fabric of sleeve 102 and/or may be incorporated directly into the fabric of sleeve 102 via the use of one or more electrically conductive fibers. Apparatus 100 may further comprise a battery 110 configured to provide a flow of power to controller 108 via a power supply interface 116 (e.g., a power cable). In certain embodiments, battery 110 may comprise a rechargeable battery. In said embodiments, sleeve 102 may comprise a pocket configured to selectively retain battery 110.

In accordance with certain embodiments, motor units 104*a-n* may each comprise a shaft configured to drive a spool or other means for gathering a length of each filament in plurality of filaments 106*a-n*. In accordance with certain embodiments, the plurality of filaments 106*a-n* are constructed from wire or monofilament line (although other materials are readily anticipated). Each filament in plurality of filaments 106*a-n* comprises a length extending from a first end to a second end. In accordance with exemplary embodiments, a first end of a filament in plurality of filaments 106*a-n* is coupled to a first connection point of a motor unit in the plurality of motor units 104*a-n* and a second end of the filament in plurality of filaments 106*a-n* is coupled to a second connection point of the motor unit in the plurality of motor units 104*a-n*. In certain embodiments, the first or second connection point of the motor unit may comprise the spool or other gathering means and/or may comprise a fixed anchor point on the housing. In accordance with certain aspects of the present disclosure, each filament in the plurality of filaments 106*a-n* is configured to define a loop when coupled to each motor unit in the plurality of motor units 104*a-n*. In certain embodiments, each filament in plurality of filaments 106*a-n* may be housed in a pocket that is sewn onto a surface of sleeve 102 to conceal each filament in plurality of filaments 106*a-n* (e.g., such that each filament in plurality of filaments 106*a-n* are covered). In accordance with exemplary embodiments, motor units 104*a-n* are operably configured to wind the plurality of filaments 106*a-n* around the spool (or other gathering means) of motor units 104*a-n* (e.g., when motor units 104*a-n* are engaged in a first direction of rotation) such that a size of the loop (i.e., the radius and circumference of the loop) defined by each of the plurality of filaments 106*a-n* is selectively reduced (i.e., made smaller). In said exemplary embodiments, motor units 104*a-n* are operably configured to unwind the plurality of filaments 106*a-n* from around the spool (or other gathering means) of motor units 104*a-n* (e.g., when motor units 104*a-n* are engaged in a second direction of rotation) such that a size of the loop (i.e., the radius and circumference of the loop) defined by each of the plurality of filaments 106*a-n* is selectively increased (i.e., made larger). In accordance with certain aspects of the present disclosure, apparatus 100 may be configured to fit a wide range of arm sizes of a user via winding/unwinding the length of plurality of filaments 106*a-n* to make the size of the loop defined by each of the plurality of filaments 106*a-n* smaller or larger.

In accordance with certain aspects of the present disclosure, a user of apparatus 100 may wear apparatus 100 on an extremity 11 of the user's body. FIG. 1 illustrates an embodiment of apparatus 100 that is configured to be worn on a user's arm; however, alternative embodiments of apparatus 100 may be readily configured to be worn on a user's leg. Apparatus 100 may be operably configured to provide compression to extremity 11 according to one or more modes of operation. In accordance with certain aspects of the present disclosure, a user may engage apparatus 100 in at least one mode of operation upon providing an input to controller 108 at user interface 118. Controller 108 may be configured to engage plurality of motor units 104*a-n* according to the at least one mode of operation. In accordance with certain aspects of the present disclosure, plurality of motor units 104*a-n* may be engaged in a first direction to wind plurality of filaments 106*a-n*. This action results in the tightening of plurality of filaments 106*a-n* against the surface of the user's arm, thereby creating pressure on user's arm for the treatment of lymphedema symptoms. In certain embodiments, controller 108 may be configured to apply differing levels of torque to motor units 104*a-n* in order to generate differing levels of pressure against the surface of extremity 11 via plurality of filaments 106*a-n*. For example, in certain embodiments, controller 108 may be configured to engage motor units 104*a-n* according to a first level of torque to generate 20 mmHg to 30 mmHg of pressure via plurality of filaments 106*a-n*. Controller 108 may be configured to engage motor units 104*a-n* according to a second level of torque to generate 30 mmHg to 40 mmHg of pressure via plurality of filaments 106*a-n*. Controller 108 may be configured to engage motor units 104*a-n* according to a third level of torque to generate 40 mmHg to 50 mmHg of pressure via plurality of filaments 106*a-n*. Controller 108 may be configured to engage motor units 104*a-n* according to a fourth level of torque to generate 50 mmHg to 60 mmHg of pressure via plurality of filaments 106*a-n*.

In certain embodiments, controller 108 may be configured to engage plurality of motor units 104*a-n* according to one or more sequence. In certain embodiments, the sequence may begin at motor unit 104*a* (i.e., adjacent to the user's wrist) and continue sequentially up the user's arm to motor unit 104*n* to create a peristaltic wave action across plurality of motor units 104*a-n*. Plurality of motor units 104*a-n* may be engaged in a second direction to unwind plurality of filaments 106*a-n* in order to release the pressure against the user's arm. In certain embodiments, at least one mode of operation of controller 108 may be configured according to one or more timing parameters; e.g., wherein controller 108 engages motor units 104*a-n* in the first direction for a specified duration. For example, controller 108 may engage motor units 104*a-n* in the first direction for 60 seconds and then disengage motor units 104*a-n* for 60 seconds. In certain embodiments, one or more timing parameters may comprise parameters for a time of day. For example, controller 108 may engage motor units 104*a-n* at a first level of torque (i.e., pressure) from 9:00 a.m. to 9:00 p.m. and engage motor units 104*a-n* at a second level of torque (i.e., pressure) from 9:00 p.m. to 9:00 a.m.

In certain embodiments, at least one mode of operation of controller 108 may be configured to engage each motor unit in the plurality of motor units 104*a-n* according to different (i.e., independent) parameters. For example, controller 108 may be configured to engage motor units 104*a* and 104*b* at a first level of torque, motor units 104*c* and 104*d* at a second level of torque, motor unit 104*e* at a third level of torque, and motor unit 104*n* at a fourth level of torque. For example, motor units 104*a* and 1046 may be configured to exert 50 mmHg to 60 mmHg of pressure, motor units 104*c* and 104*d* may be configured to exert 40 mmHg to 50 mmHg of pressure, motor unit 104*e* may be configured to exert 30 mmHg to 40 mmHg of pressure, and motor unit 104*f* may be configured to exert 20 mmHg to 30 mmHg of pressure. In accordance with certain aspects of the present disclosure, the user may engage apparatus 100 according to the one or more mode of operation in order to treat lymphedema symptoms at extremity 11.

Figure 1B:
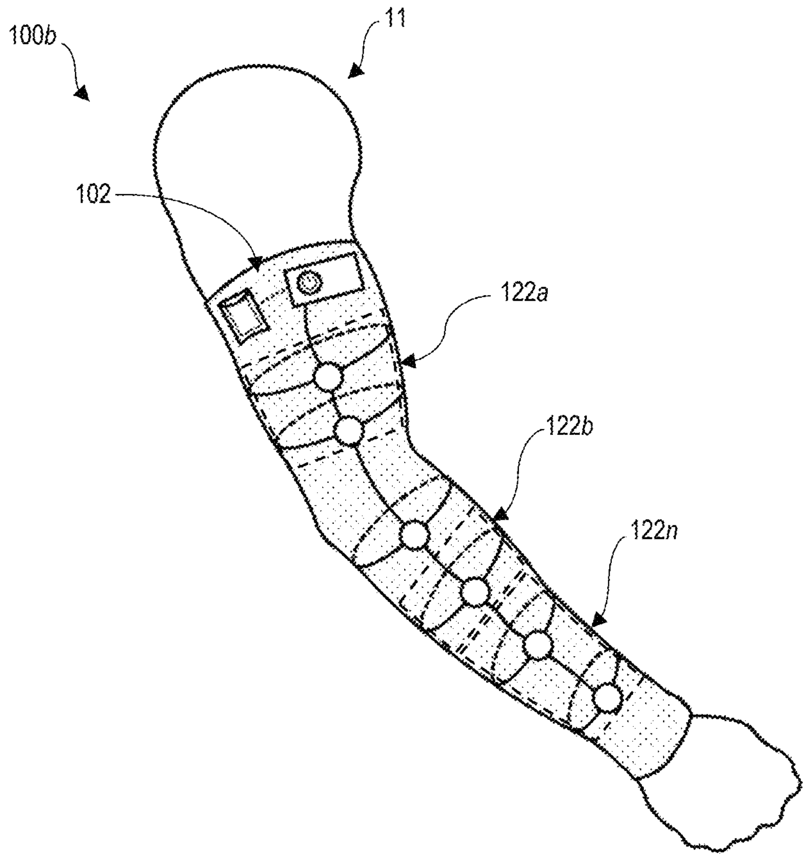
FIG. 1B is a diagram of an alternative embodiment of a lymphedema compression sleeve apparatus, in accordance with certain aspects of the present disclosure.
Figure 1C:
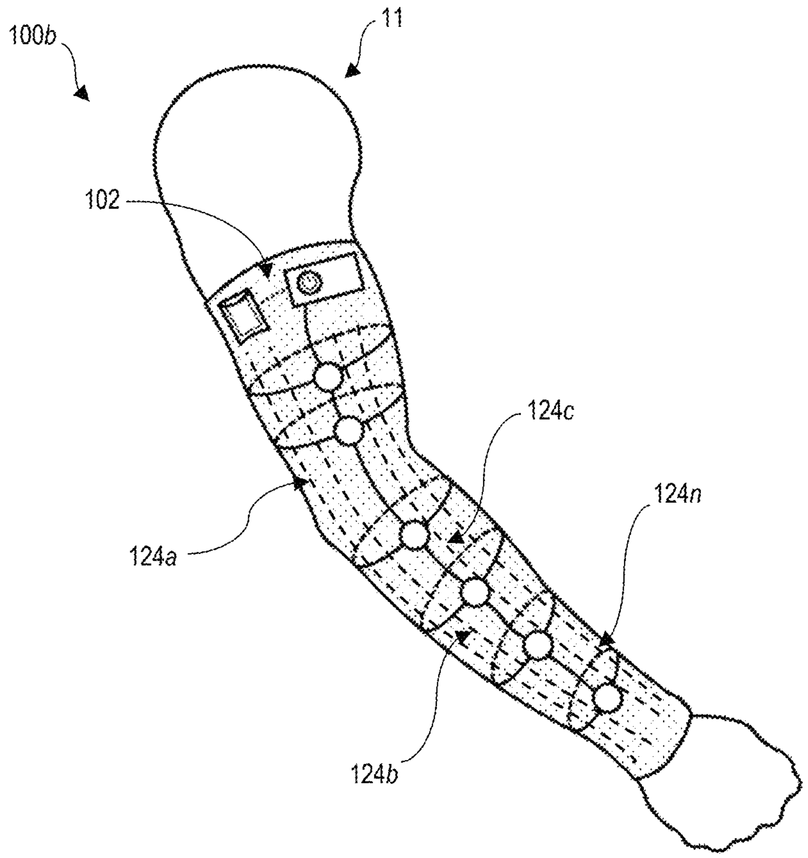
FIG. 1C is a diagram of an alternative embodiment of a lymphedema compression sleeve apparatus, in accordance with certain aspects of the present disclosure.

Referring now to FIGS. 1B and 1C, alternative embodiments of lymphedema compression sleeve apparatus 100, as shown in FIG. 1, are shown. In accordance with certain aspects of the present disclosure, lymphedema compression sleeve apparatus 100*b* and lymphedema compression sleeve apparatus 100*c* comprise all of the same elements of lymphedema compression sleeve apparatus 100, as shown in FIG. 1. In accordance with certain aspects of the present disclosure, lymphedema compression sleeve apparatus 100*b* and lymphedema compression sleeve apparatus 100*c* may comprise one or more additional pressure-distributing means for distributing the pressure generated by each of the motor units over the user's extremity 11. In accordance with certain embodiments, as shown in FIG. 1B, apparatus 100*b* may comprise one or more inserts 122*a-n* incorporated into sleeve 102. In certain embodiments, inserts 122*a-n* may be disposed on a surface of sleeve 102 or sewn into sleeve 102 (i.e., concealed within one or more fabric layers). In certain embodiments, inserts 122*a-n* may be constructed of one or more rigid plastic sheets (or other similar material) configured to distribute the pressure generated by the adjacent motor unit(s) over the user's extremity 11. In certain embodiments, inserts 122*a-n* may be constructed of a wire mesh being disposed on or incorporated into sleeve 102. The wire mesh may be configured to distribute the pressure generated by the adjacent motor unit(s) over the user's extremity 11. In an alternative embodiment, as shown in FIG. 1C, apparatus 100*c* may comprise one or more wires 124*a-n* disposed on or incorporated into sleeve 102. In accordance with certain embodiments, the one or more wires 124*a-n* may be oriented along a length of sleeve 102 between a distal end (i.e., adjacent to the user's wrist) and a proximal end (i.e., adjacent to the user's shoulder). The one or more wires 124*a-n* may intersect perpendicularly with the one or more filaments (as described in FIG. 1) such that the pressure generated by the one or more filaments against the surface of the one or more wires 124*a-n* may be distributed laterally along the length of the one or more wires 124*a-n*. In accordance with certain embodiments, the one or more wires may be constructed of a metal material, such as copper, aluminum, stainless steel, brass, and the like. The gauge of the wire may vary according to the desired level of rigidity according to one or more functional specifications.

Figure 2:
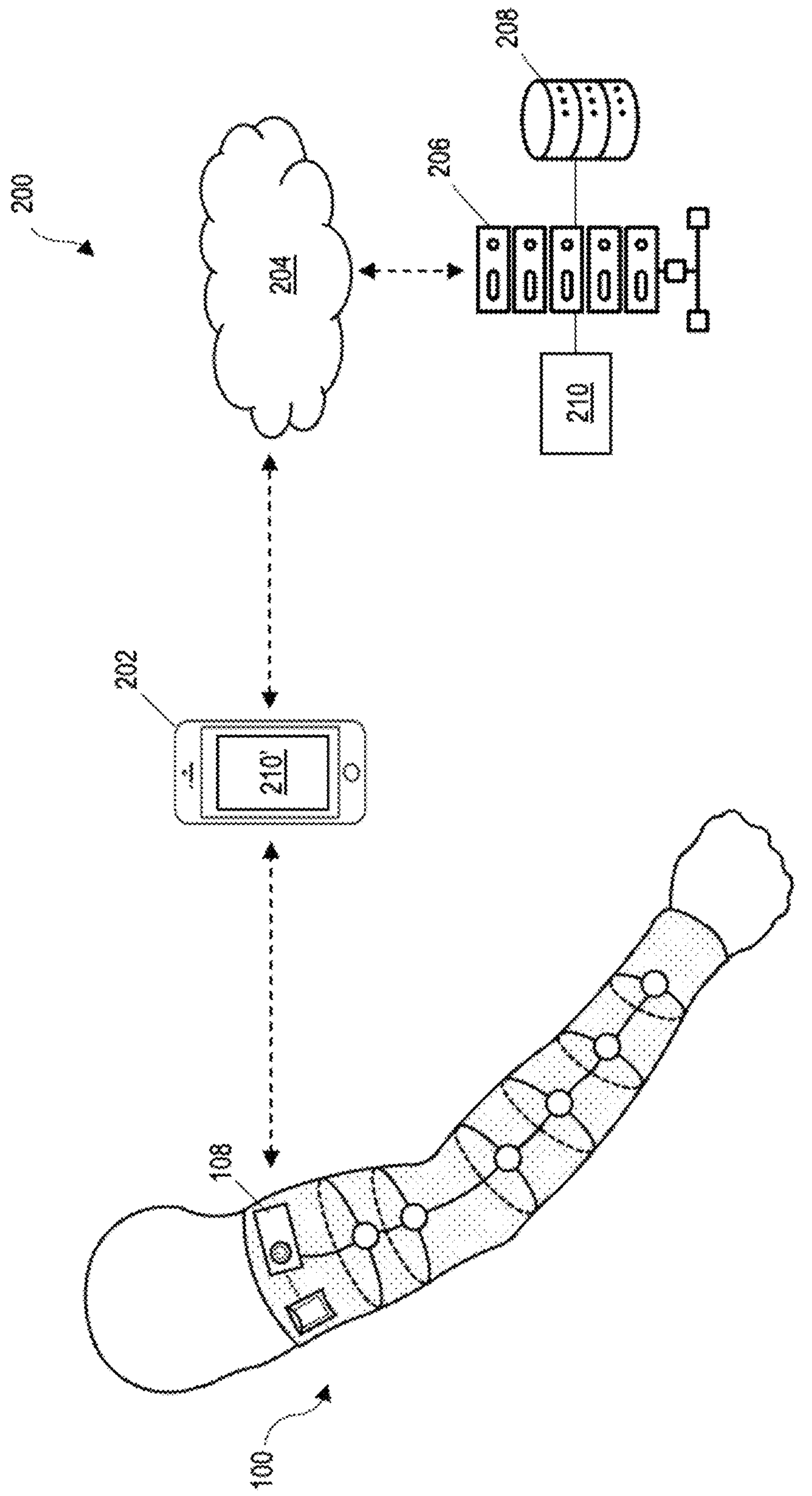
FIG. 2 is a system diagram of a lymphedema compression sleeve system, in accordance with certain aspects of the present disclosure.

Referring now to FIG. 2, a system diagram of a lymphedema compression sleeve system 200 is shown. In accordance with certain aspects of the present disclosure, system 100 may comprise apparatus 100, as shown and described in association with FIG. 1. System 200 may comprise an end user device 202 and one or more application server 206. End user device 202 may comprise an external electronic device comprising a smartphone, a tablet computer, personal computer, external controller (e.g., ARDUINO, RASPBERRY PI, etc.), and the like. In accordance with certain aspects of the present disclosure, end user device 202 may be communicably engaged with application server 206 via a network interface 204 (e.g., Internet, cellular and the like). Application server 206 may be communicably engaged with one or more application database 208. In accordance with certain aspects of the present disclosure, application server 206 may host an end user application 210 thereon. End user application 210 may comprise a plurality of processor-executable instructions for commanding one or more operations of one or more routines for lymphedema compression sleeve system 200. Application server 206 may be configured to provide an end user instance 210' of end user application 210 to end user device 202 (e.g., via network interface 204). End user instance 210' may comprise a native mobile instance of end user application 210, a mobile Web-based instance of end user application 210, or a hybrid native/Web-based instance end user application 210. End user instance 210' may comprise a graphical user interface configured to enable the end user to command one or more operations of end user application 210. In accordance with certain aspects of the present disclosure, the one or more operations of end user application 210 comprise operations for configuring one or more settings of controller 108 and/or commanding one or more operations for controller 108. In accordance with certain embodiments, controller 108 is communicably engaged with end user device 202 via a wireless data transfer interface (e.g., BLUETOOTH low energy, or other wireless data transfer protocol). In certain embodiments, the graphical user interface of end user instance 210' may comprise one or more elements configured to enable the end user to configure and/or command one or more: operational mode apparatus 100; pressure settings of apparatus 100; timing parameters for operation of apparatus 100; pressure sequence of apparatus 100; calibration mode(s) for apparatus 100; and the like. End user instance 210' may be configured to enable the end user to command controller 108 to engage an operational mode of apparatus 100 (i.e., turn ON) and disengage an operational mode of apparatus 100 (i.e., turn OFF). In certain embodiments, controller 108 may be configured to communicate one or more data inputs to end user device 202 via the wireless data transfer interface. For example, the one or more data inputs may comprise activity data for one or more operational sessions of apparatus 100. End user device 202 may be configured to receive the activity data and process the activity data according to one or more operations of end user instance 210'. In certain embodiments, the graphical user interface of end user instance 210' may comprise one or more elements configured to enable the end user to provide one or more user-generated inputs. For example, inputs related to self-reported data for the user's lymphedema symptoms and usage log for apparatus 100. In accordance with certain aspects of the present disclosure, end user instance 210' may comprise one or more operations for communicating the activity data for apparatus 100 and/or the self-reported data from the end user to application server 206 via network interface 204 (e.g., according to one or more data transfer protocols, such as HTTP). End user application 210 may be configured to receive and process the activity data and the self-reported data according to one or more data processing framework. In certain embodiments, end user application 210 may be configured to analyze the activity data and the self-reported data to evaluate the efficacy of apparatus 100 and/or provide one or more recommendations for continued use of apparatus 100 for the end user. For example, the one or more recommendations may comprise one or more recommended settings, operational modes, timing and duration of use, and the like. In certain embodiments, end user application 210 may be configured to automatically update one or more settings or parameters for apparatus 100 based on the analysis of the activity data and the self-reported data.

Figure 3:
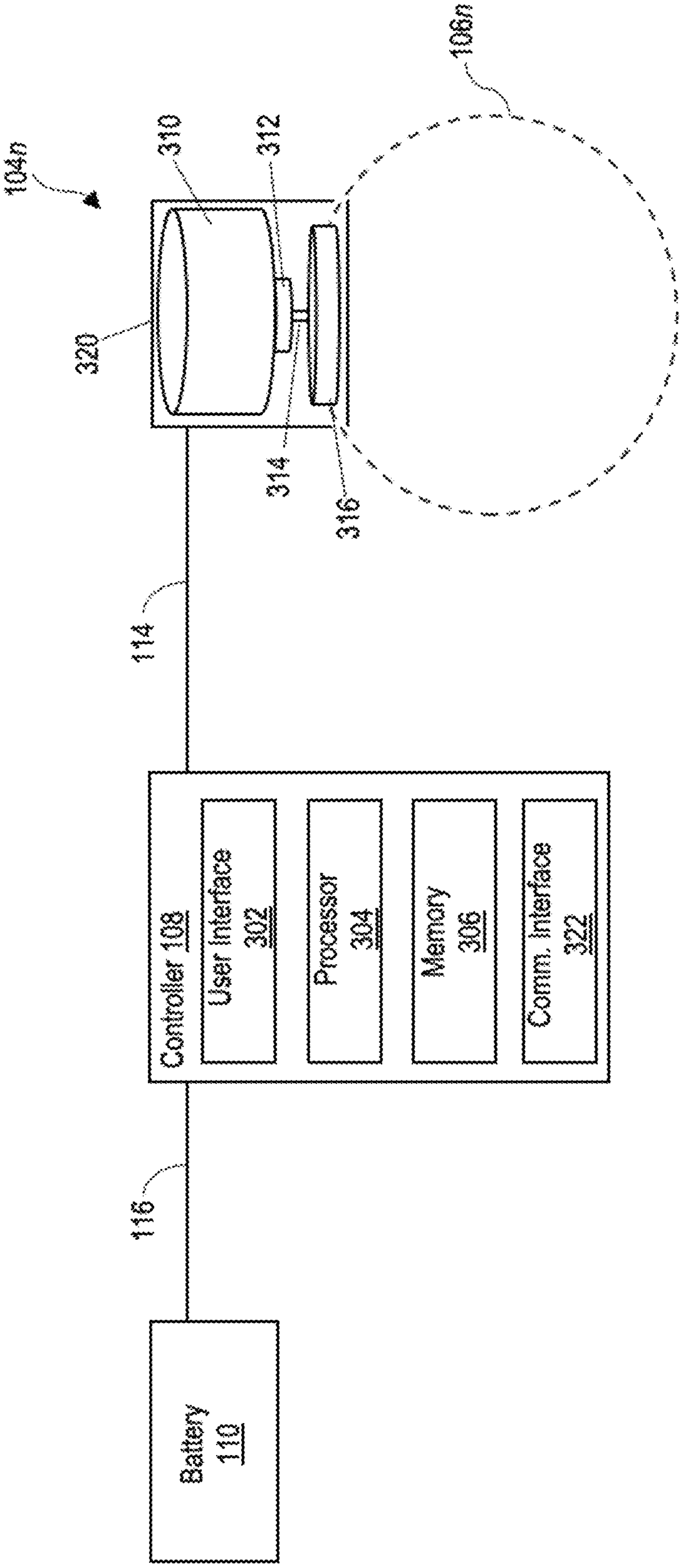
FIG. 3 is a schematic diagram of a lymphedema compression sleeve apparatus, in accordance with certain aspects of the present disclosure.

Referring now to FIG. 3, with cross-reference to FIG. 1, a schematic diagram of the components of lymphedema compression sleeve apparatus (e.g., apparatus 100 as shown in FIG. 1) is shown. As discussed in the foregoing description in association with FIG. 1, apparatus 100 (as shown in FIG. 1) comprises a plurality of motor units 104*n* (as shown in FIG. 1). FIG. 3 depicts a single motor unit 104*n* to illustrate the component parts for each of the plurality of motor units 104*a-n* (as shown in FIG. 1). In accordance with certain aspects of the present disclosure, controller 108 may comprise a user interface 302, a processor 304, a memory device 306, and (optionally) a wireless communications interface 322. Processor 304 may comprise at least one integrated circuit and/or microprocessor. Memory device 306 may comprise a non-transitory memory device configured to store a plurality of operations configured to be executed by processor 304 (e.g., to command one or more operations of motor unit 104*n*). In certain embodiments, wireless communications interface 322 may comprise a chipset comprising a radio frequency transceiver. The radio frequency transceiver may comprise a BLUETOOTH transceiver. In certain embodiments, wireless communications interface 322 is configured to establish a wireless data transfer interface (e.g., BLUETOOTH interface) with an external electronic device (e.g., a smartphone, etc.). User interface 302 may comprise one or more input means (e.g., buttons) configured to enable a user to command one or more operations of controller 108. User interface 302 may comprise one or more input means for controlling an ON/OFF function and one or more operational modes of controller 108. User interface 302 may comprise an input/output (I/O) interface configured to display one or more outputs to an end user, such as battery level, operational mode, ON/OFF status, and the like. Controller 108 may be operably engaged with battery 110 via power supply 116. Power supply 116 may comprise a power wire/cable configured to provide a flow of electricity from battery 110 to controller 108. Controller 108 may be operably engaged with motor unit 104*n* via bus 114. Bus 114 may comprise a power interface and, optionally, a data transfer interface. Bus 114 is configured to provide a flow of power to an electric motor 310.

In accordance with certain aspects of the present disclosure, motor unit 104*n* comprises a housing 320, electric motor 310, at least one (optional) sensor 312, a shaft 314, and a spool 316. Housing 320 may comprise a rigid plastic or metal housing configured to house the foregoing components. Housing 320 may comprise one or more apertures configured to receive a first end and/or a second end of filament 106*n* therethrough. In certain embodiments, electric motor 310 may comprise a coreless DC motor. The components of a coreless DC motor are well-known in the art and need not be discussed at length for the purpose of brevity. Sensor 312 may be operably engaged with bus 114 to communicate one or more sensor signals to controller 108. In certain embodiments, sensor 312 may comprise a torque sensor or other type of sensor configured to measure an amount of force exerted by shaft 314 against filament 106*n*. In certain embodiments, sensor 312 may comprise a sensor configured to measure a position of spool 316 and/or a number of rotations for spool 316 relative to a starting position. In said embodiments, controller 108 may be configured to calculate a measurement of the user's extremity based on positional and/or rotational data from sensor 312. In certain embodiments, sensor 312 may comprise two or more sensors (e.g., configured to perform two or more different functions). In accordance with certain aspects of the present disclosure, electric motor 310 is configured to drive shaft 314 in a first direction of rotation and, optionally, a second direction of rotation. Shaft 314 may be coupled to spool 316 to rotate spool 316 in the first direction of rotation and, optionally, the second direction of rotation. In certain embodiments, spool 316 may comprise a cylindrical structure around which a length of filament 106*n* may be wound. Spool 316 may be substituted by another means for gathering a length of filament 106*n*. For example, shaft 314 may comprise an aperture or other attachment means to which a first end or a second end of the filament 106*n* may be coupled. In said embodiments, the length of filament 106*n* may be wound directly around shaft 314.

In accordance with certain aspects of the present disclosure, electric motor 310 may be configured to apply variable levels of torque in response to a command from controller 108. Each level of torque may correspond to a different level of pressure exerted by filament 106*n* on a surface of a user's extremity. In certain embodiments, controller 108 may be configured to engage electric motor 310 according to at least four levels of torque. At a first level of torque, electric motor 310 may be configured apply tension to filament 106*n* to exert 20 mmHg to 30 mmHg of pressure. At a second level of torque, electric motor 310 may be configured apply tension to filament 106*n* to exert 30 mmHg to 40 mmHg of pressure. At a third level of torque, electric motor 310 may be configured apply tension to filament 106*n* to exert 40 mmHg to 50 mmHg of pressure. At a fourth level of torque, electric motor 310 may be configured apply tension to filament 106*n* to exert 50 mmHg to 60 mmHg of pressure. In accordance with certain aspects of the present disclosure, controller 108 is configured to engage electric motor 310 according to one or more sequence of operation (e.g., torque, direction, on/off, etc.).

Figure 4A:
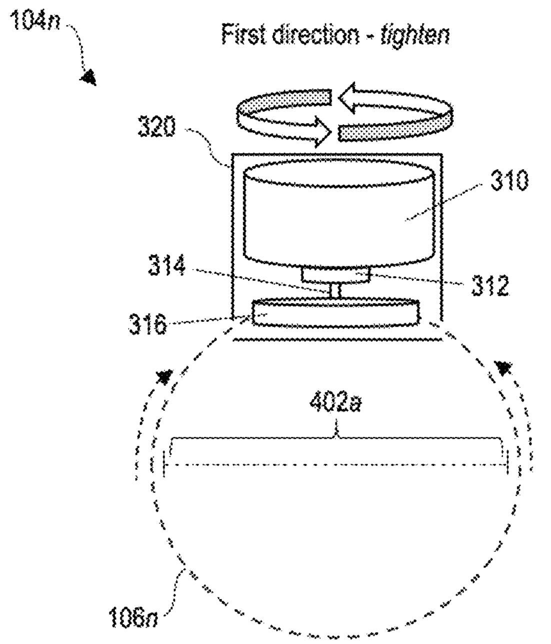
FIGS. 4A-4B are functional diagrams of a motor unit of the lymphedema compression sleeve apparatus, in accordance with certain aspects of the present disclosure.
Figure 4B:
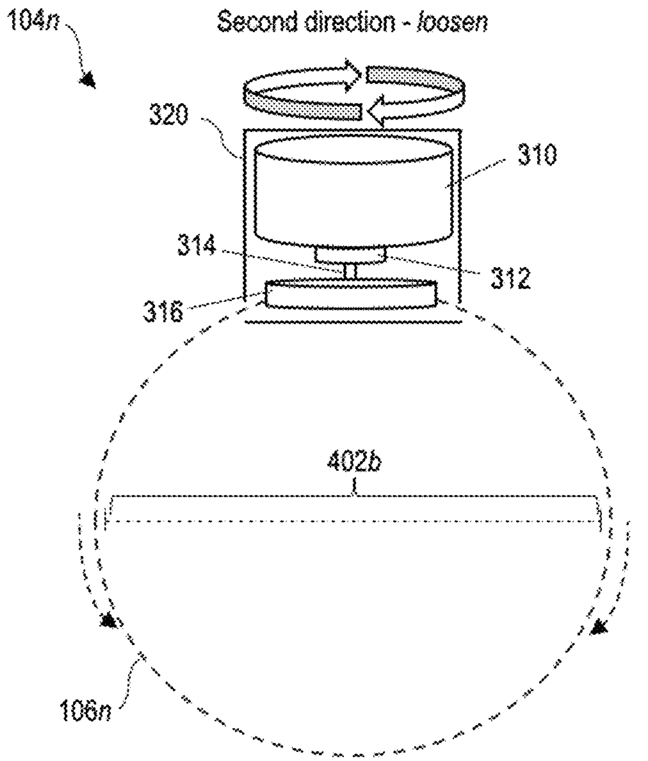

Referring now to FIGS. 4A-4B, with cross-reference to FIG. 1, functional diagrams of a motor unit 104*n* of the lymphedema compression sleeve apparatus 100 (as shown in FIG. 1) are shown. FIGS. 4A-4B illustrate motor unit 104*n* comprising housing 320, motor 310, at least one (optional) sensor 312, shaft 314, and spool 316. FIG. 4A illustrates motor unit 104*n* wherein motor 310 is engaged in a first direction of rotation to wind filament 106*n* around spool 316. In accordance with certain aspects of the present disclosure, the action of winding filament 106*n* around spool 316 is configured to reduce a radius 402*a* of the loop formed by filament 106*n*. When operably installed on compression sleeve 102 (as shown in FIG. 1), the action of winding filament 106*n* around spool 316 is configured to tighten filament 106*n* around the user's extremity 11 (as shown in FIG. 1), thereby increasing the level of pressure exerted by filament 106*n* on the user's extremity 11 (as shown in FIG. 1). FIG. 4B illustrates motor unit 104*n* wherein motor 310 is engaged in a second direction of rotation to unwind filament 106*n* from around spool 316 or otherwise release the force exerted by motor 310 on spool 316. In accordance with certain aspects of the present disclosure, the action of unwinding filament 106*n* from around spool 316 is configured to increase a radius 402*b* of the loop formed by filament 106*n*. When operably installed on compression sleeve 102 (as shown in FIG. 1), the action of unwinding or releasing filament 106*n* from around spool 316 is configured to loosen filament 106*n* from around the user's extremity 11 (as shown in FIG. 1), thereby decreasing the level of pressure exerted by filament 106*n* on the user's extremity 11 (as shown in FIG. 1).

Figure 5A:
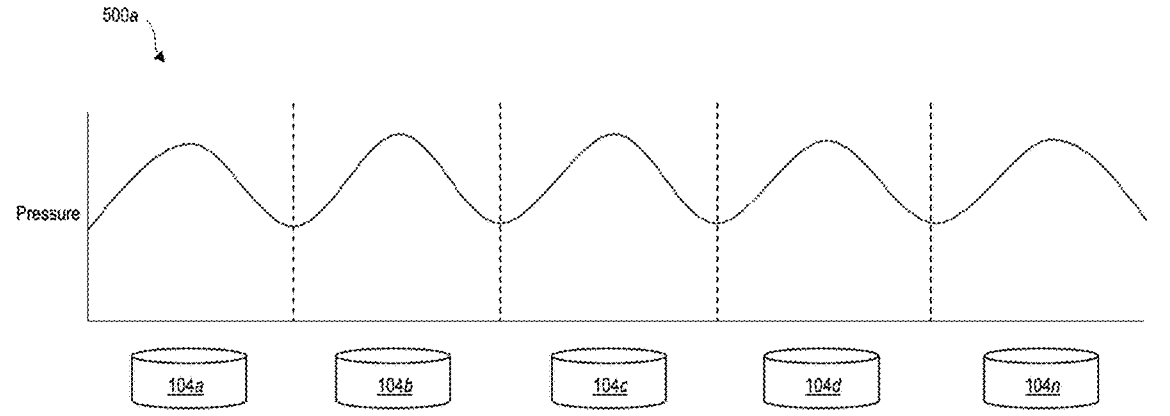
FIGS. 5A-5C are plots of various operational modes for the lymphedema compression sleeve apparatus, in accordance with certain aspects of the present disclosure.
Figure 5B:
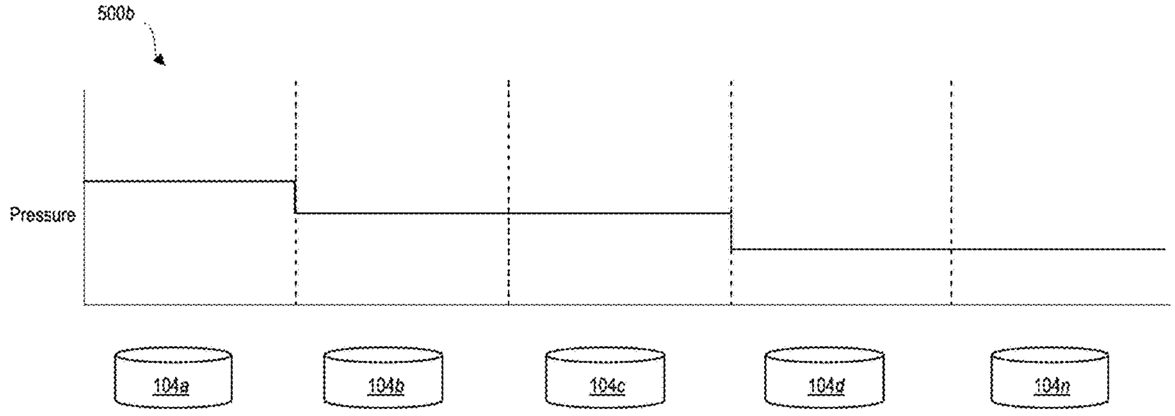
Figure 5C:
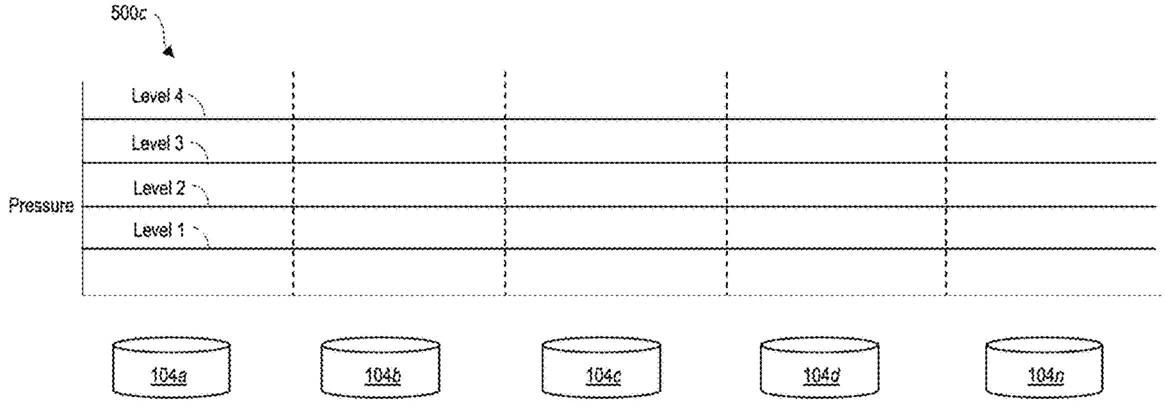

Referring now to FIGS. 5A-5C, with cross-reference to FIG. 1, plots 500*a-c* of various operational modes for the lymphedema compression sleeve apparatus 100 (as shown in FIG. 1) are shown. In accordance with certain aspects of the present disclosure, plots 500*a-c* illustrate levels of pressure exerted by motor units 104*a-n* in accordance with the various operational modes. The operational modes illustrated by plots 500*a-c* are shown for illustrative purposes only and it is anticipated that numerous other modes of operation, include customizable modes of operation, may be readily configured and implemented (e.g., via controller 108 as shown in FIG. 1). In accordance with certain aspects of the present disclosure, some of the modes of operation illustrated by plots 500*a-c* may be implemented concurrently. For example, a pulsed sequence mode of operation may be implemented concurrently with one or more pressure settings.

As shown in FIG. 5A, plot 500*a* illustrates a first mode of operation wherein motor units 104*a-n* are operably engaged in a sequence beginning at motor unit 104*a* and continuing sequentially to motor unit 104*n*. In accordance with certain aspects of the present disclosure, plot 500*a* illustrates a first mode of operation wherein motor units 104*a-n* are operably engaged to generate a peristaltic wave action (e.g., via the pressure exerted by filaments 106*a-n* as shown in FIG. 1) from a distal end of a user's extremity (e.g., at or near the user's wrist) to a proximal end of the user's extremity (e.g., at or near the user's shoulder). In accordance with certain embodiments, the peristaltic wave action generated by the first mode of operation, as shown in plot 500*a*, is configured move lymphatic fluid from the distal end of a user's extremity toward the proximal end of the user's extremity to alleviate lymphedema symptoms.

As shown in FIG. 5B, plot 500*b* illustrates a second mode of operation wherein motor units 104*a-n* are operably engaged at different pressure levels. In accordance with certain aspects of the present disclosure, plot 500*b* illustrates a second mode of operation wherein motor units 104*a-n* are operably engaged to generate a pressure gradient (e.g., via the pressure exerted by filaments 106*a-n* as shown in FIG. 1) between a distal end of a user's extremity (e.g., at or near the user's wrist) and a proximal end of the user's extremity (e.g., at or near the user's shoulder). In accordance with certain embodiments, the second mode of operation is configured wherein motor unit 104*a* exerts a greater amount of pressure than motor units 104*b-c*, and wherein motor units 104*b-c* exert a greater amount of pressure than motor units 104*d-n*. In accordance with certain embodiments, the pressure gradient generated by the second mode of operation, as shown in plot 500*b*, is configured to reduce the accumulation of lymphatic fluid at the distal area of the user's extremity and encourage the flow of lymphatic fluid toward the proximal end of the user's extremity to alleviate lymphedema symptoms.

As shown in FIG. 5C, plot 500*c* illustrates different pressure levels at which motor units 104*a-n* may be engaged according to certain modes of operation. In accordance with certain aspects of the present disclosure, plot 500*c* illustrates four pressure levels at which motor units 104*a-n* may be engaged according to certain modes of operation. In certain embodiments, a first level of pressure may correspond to a first level of torque at which motor units 104*a-n* may be engaged to generate 20 mmHg to 30 mmHg of pressure via filaments 106*a-n* (as shown in FIG. 1). In certain embodiments, a second level of pressure may correspond to a second level of torque at which motor units 104*a-n* may be engaged to generate 30 mmHg to 40 mmHg of pressure via filaments 106*a-n* (as shown in FIG. 1). In certain embodiments, a third level of pressure may correspond to a third level of torque at which motor units 104*a-n* may be engaged to generate 40 mmHg to 50 mmHg of pressure via filaments 106*a-n* (as shown in FIG. 1). In certain embodiments, a fourth level of pressure may correspond to a fourth level of torque at which motor units 104*a-n* may be engaged to generate 50 mmHg to 60 mmHg of pressure via filaments 106*a-n* (as shown in FIG. 1). In accordance with certain aspects of the present disclosure, motor units 104*a-n* may be engaged at different levels according to certain timing parameters. For example, units 104*a-n* may be engaged at a first or second level of pressure during daytime hours (i.e., when lymphedema symptoms are less severe) and may be engaged at a third or fourth level of pressure during nighttime hours (i.e., when lymphedema symptoms are more severe). In accordance with certain aspects of the present disclosure, motor units 104*a-n* may be selectively engaged at different levels according to a degree of severity of lymphedema symptoms for the user (i.e., at a greater level of pressure when lymphedema symptoms are more severe and at a lesser level of pressure when lymphedema symptoms are less severe).

Figure 6:
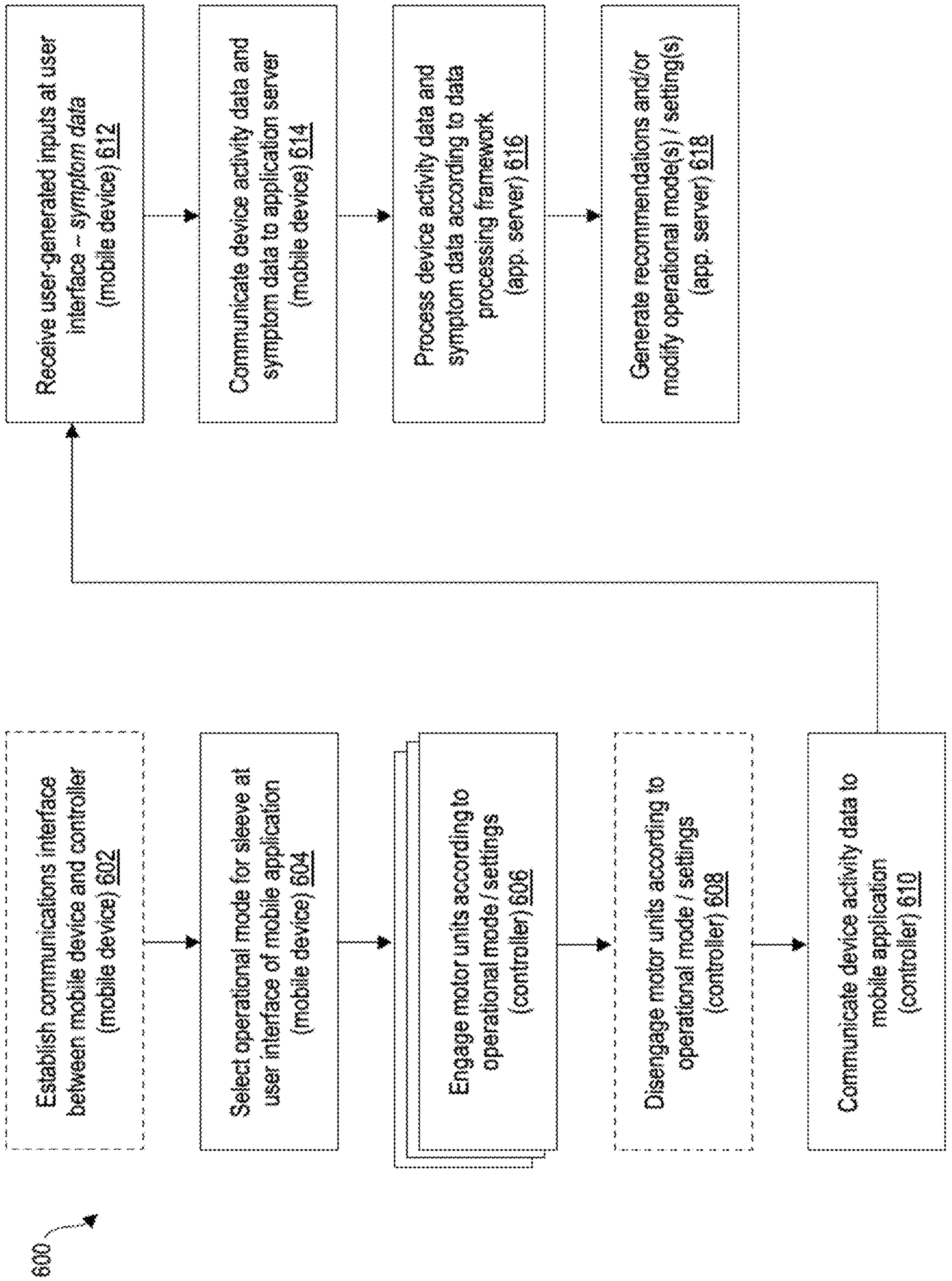
FIG. 6 is a functional block diagram of a routine of a lymphedema compression sleeve system, in accordance with certain aspects of the present disclosure.

Referring now to FIG. 6, a functional block diagram of a routine 600 of a lymphedema compression sleeve system is shown. In accordance with certain aspects of the present disclosure, routine 600 may be embodied within one or more operations of controller 108 of apparatus 100, as shown and described in FIG. 1, and/or may be embodied within one or more routine of system 200, as shown and described in FIG. 2. The operations in routine 600 may be performed in the order presented, in a different order, or simultaneously. Further, in some exemplary embodiments, some of the operations may be omitted, added, modified, skipped, or the like without departing from the scope of the invention. In accordance with certain aspects of the present disclosure, routine 600 may comprise one or more steps or operations 602-618 for generating one or more recommendations for modifying or configuring one or more operational mode or settings for a lymphedema compression sleeve apparatus based on device activity data and patient-reported symptom data.

In accordance with certain aspects of the present disclosure, routine 600 may comprise one or more steps or operations for establishing a wireless communications interface between an external electronic device (e.g., a smartphone, etc.) and a controller of lymphedema compression sleeve apparatus (Step 602). In certain embodiments, step 602 may comprise establishing a BLUETOOTH low energy protocol between the mobile device (e.g., as the central device in the BLUETOOTH protocol) and the controller of the lymphedema compression sleeve apparatus (e.g., as the peripheral device in the BLUETOOTH protocol). In accordance with certain aspects of the present disclosure, the mobile device comprises a native or Web-based mobile software application configured to command one or more operations of the controller of lymphedema compression sleeve apparatus. In accordance with certain embodiments, routine 600 may comprise one or more steps or operations for selecting an operational mode for the lymphedema compression sleeve apparatus via a user interface of the mobile software application configured (Step 604). The operational mode may comprise one or more operational settings and/or parameters for engaging a plurality of motor units of the lymphedema compression sleeve apparatus. Step 604 may comprise one or more steps or operations for sending a command signal from the mobile device to the controller of the lymphedema compression sleeve apparatus via the wireless communications interface. Routine 600 may further comprise one or more steps or operations for processing the command signal at the controller of the lymphedema compression sleeve apparatus and engaging the plurality of motor units according to the selected operational mode (e.g., according to the one or more operational settings and/or parameters for engaging the plurality of motor units of the lymphedema compression sleeve apparatus) (Step 606). Step 606 may comprise one or more steps or operations for engaging the plurality of motor units at one or more discrete time points and/or for a specified duration. In accordance with certain aspects of the present disclosure, routine 600 may comprise one or more operations for disengaging the plurality of motor units according to the selected operational mode (e.g., according to the one or more operational settings and/or parameters for disengaging the plurality of motor units of the lymphedema compression sleeve apparatus) (Step 608). In accordance with certain aspects of the present disclosure, Step 608 corresponds to an ending of a "session" for the lymphedema compression sleeve apparatus. As used herein, the term "session" refers to a discrete time period in which the lymphedema compression sleeve apparatus is engaged according to the one or more operational settings and/or parameters. In accordance with certain embodiments, the controller may be configured to store a plurality of activity data related to the session in a local memory device of the controller. In accordance with said embodiments, routine 600 may comprise one or more steps or operations for communicating the activity data to the mobile application via the wireless communications interface between the controller and the mobile electronic device (Step 610).

In accordance with certain aspects of the present disclosure, the user interface of the mobile software application may comprise one or more graphical elements configured to receive a plurality of user-generated inputs from the user. In certain embodiments, the plurality of user-generated inputs may comprise self-reported symptom data related to lymphedema symptoms for the user. In accordance with said embodiments, routine 600 may comprise one or more steps or operations for receiving the self-reported symptom data related to lymphedema symptoms for the user at the user interface of the mobile software application (Step 612). In accordance with said embodiments, routine 600 may comprise one or more steps or operations for communicating the activity data received from the controller and the self-reported symptom data received at the user interface of the mobile software application to an application server communicably engaged with the mobile electronic device via a network interface (Step 614). The application server may be configured to host a server-side instance of the mobile software application. The server-side instance of the mobile software application may be configured to execute one or more data processing steps of the mobile software application at the application server. In accordance with certain aspects of the present disclosure, routine 600 may comprise one or more steps or operations for processing the activity data and the self-reported symptom data according to at least one data processing framework (Step 616). The at least one data processing framework may comprise at least one data model configured to evaluate one or more associations between the activity data and the self-reported symptom data. In accordance with certain aspects of the present disclosure, routine 600 may comprise one or more steps or operations for generating one or more recommendation and/or modifying one or more operational mode or settings for the controller of the lymphedema compression sleeve apparatus based on the one or more evaluated association between the activity data and the self-reported symptom data (Step 618). Step 618 may comprise one or more business rules (i.e., if/then parameters) for generating the one or more recommendation and/or modifying one or more operational mode or settings. For example, if the activity data provides that the lymphedema compression sleeve apparatus was engaged at a first level of pressure (e.g., 30 mmHg) for a first duration (e.g., 30 minutes) and the self-reported symptom data suggested that the user's lymphedema was not alleviated, then Step 618 may comprise one or more steps or operations for generating a recommendation to increase the level of pressure to a second level (e.g., 50 mmHg) for a second duration (e.g., 60 minutes) in a subsequent session for the lymphedema compression sleeve apparatus. In certain embodiments, Step 618 may comprise one or more steps or operations for displaying the recommendation at the user interface of the mobile software application. In certain embodiments, Step 618 may comprise one or more steps or operations for updating one or more settings or operations for the controller of the lymphedema compression sleeve apparatus (e.g., wherein the mobile electronic device serves as a communications broker between the application server and the controller of the lymphedema compression sleeve apparatus).

Figure 7:
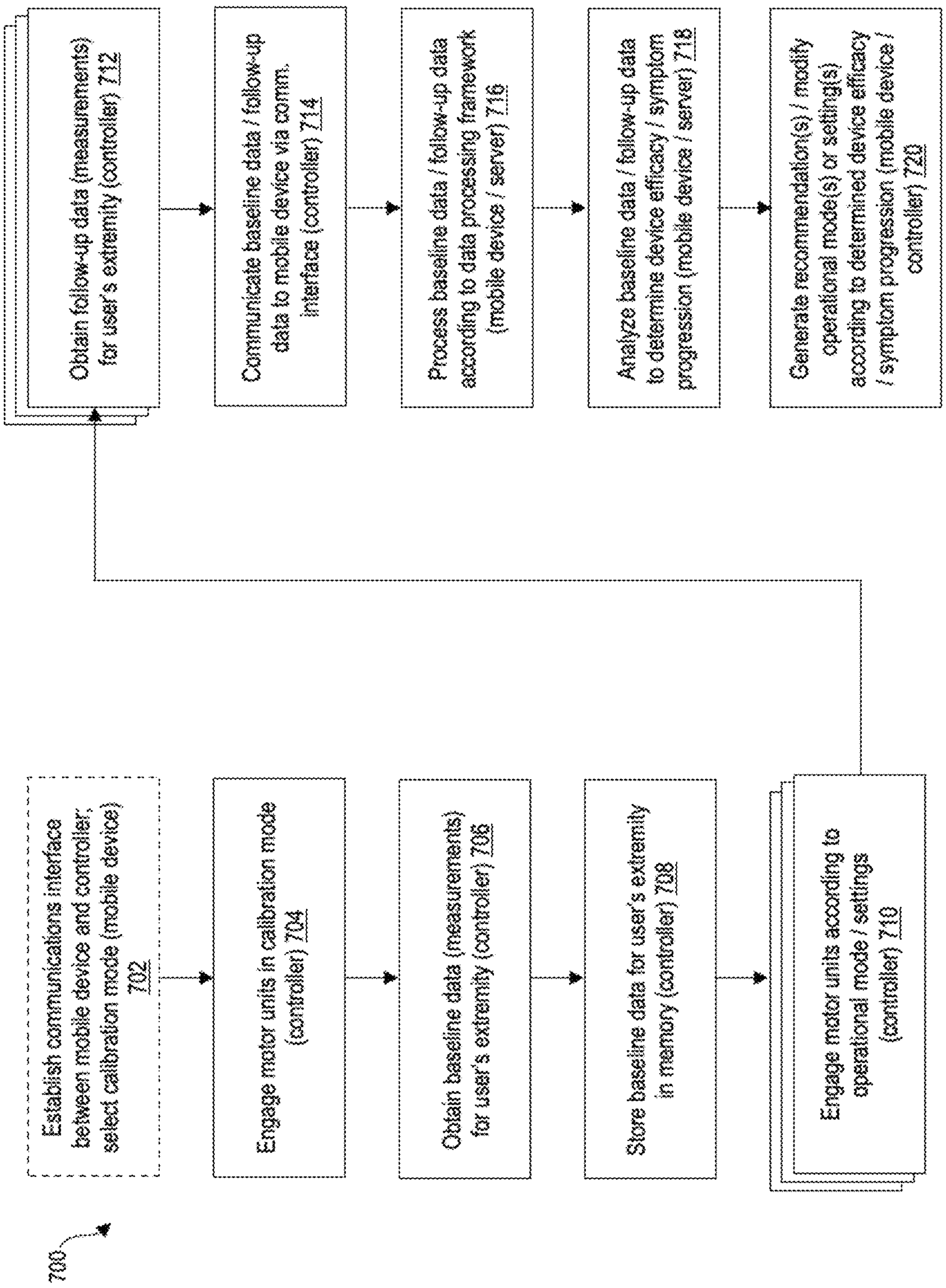
FIG. 7 is a functional block diagram of a routine of a lymphedema compression sleeve system, in accordance with certain aspects of the present disclosure.

Referring now to FIG. 7, a functional block diagram of a routine 700 of a lymphedema compression sleeve system is shown. In accordance with certain aspects of the present disclosure, routine 700 may be embodied within one or more operations of controller 108 of apparatus 100, as shown and described in FIG. 1, and/or may be embodied within one or more routine of system 200, as shown and described in FIG. 2. The operations in routine 700 may be performed in the order presented, in a different order, or simultaneously. Further, in some exemplary embodiments, some of the operations may be omitted, added, modified, skipped, or the like without departing from the scope of the invention. In accordance with certain aspects of the present disclosure, routine 700 may comprise one or more steps or operations 702-720 for measuring one or more areas of a user's extremity to assess a degree of severity of a user's lymphedema symptoms and modifying or configuring one or more operational mode or settings for a lymphedema compression sleeve apparatus based on said measurements.

In accordance with certain aspects of the present disclosure, routine 700 may comprise one or more steps or operations for establishing a wireless communications interface between an external electronic device (e.g., a smartphone, etc.) and a controller of a lymphedema compression sleeve apparatus (e.g., lymphedema compression sleeve apparatus 100, as shown and described in FIG. 1) (Step 702). In certain embodiments, step 702 may comprise establishing a BLUETOOTH low energy protocol between the mobile device (e.g., as the central device in the BLUETOOTH protocol) and the controller of the lymphedema compression sleeve apparatus (e.g., as the peripheral device in the BLUETOOTH protocol). In accordance with certain aspects of the present disclosure, the mobile device comprises a native or Web-based mobile software application configured to command one or more operations of the controller of lymphedema compression sleeve apparatus. The native or Web-based mobile software application may comprise a user interface configured to enable a user to select and/or configure at least one operational mode for the apparatus. In certain embodiments, Step 702 may comprise one or more steps or operations to enable a user to select/configure a calibration mode for the apparatus (e.g., via one or more inputs at the user interface). In accordance with certain embodiments, Step 702 may comprise one or more steps or operations for sending (e.g., via the wireless communications interface) a command signal from the mobile device to the controller of the lymphedema compression sleeve apparatus to the user in response to selecting/configuring the calibration mode for the apparatus at the user interface. In accordance with certain aspects of the present disclosure, routine 700 may comprise one or more steps or operations for engaging the motor units in a calibration mode (e.g., in response to receiving/processing the command signal from the mobile device) (Step 704). In accordance with certain aspects of the present disclosure, step 704 may comprise one or more steps or operations for measuring one or more areas of a user's extremity (e.g., at a user's wrist, forearm, and bicep). Routine 700 may comprise one or more steps or operations for obtaining baseline data for the user's extremity based on one or more sensor inputs (Step 706). In accordance with certain aspects of the present disclosure, the baseline data may comprise measurements for the one or more areas of a user's extremity. In certain embodiments, the measurements may be extrapolated based on feedback from at least one pressure sensor. Routine 700 may comprise one or more steps or operations for storing the baseline data for the user's extremity in a local memory device of the controller and/or communicating the baseline data (e.g., via the controller) to the mobile device via the wireless communications interface (Step 708).

In accordance with certain aspects of the present disclosure, routine 700 may proceed by executing one or more steps or operations for engaging the motor units of the apparatus according to one or more operational mode (Step 710). The one or more operational mode may comprise one or more settings for the motor units. The one or more settings may comprise one or more parameters for pressure level, pressure duration, timing of operation, and/or engagement sequence for the motor units. In accordance with certain aspects of the present disclosure, routine 700 may comprise one or more steps or operations for obtaining follow-up data (e.g., measurements) for the user's extremity (Step 712). The follow-up data may be obtained/calculated continuously, in real-time, or may be obtained/calculated at one or more designated intervals. In accordance with certain aspects of the present disclosure, routine 700 may comprise one or more steps or operations for communicating the follow-up data and the baseline data (if not already communicated in a prior step) from the controller to the mobile device via the wireless communications interface (Step 714). In certain embodiments, step 714 may comprise one or more steps or operations for communicating the follow-up data and the baseline data to an application server via a data transfer interface between the mobile device and the application server. Routine 700 may comprise one or more steps or operations for processing (e.g., via the mobile device and/or the application server) the follow-up data and the baseline data (Step 716). Step 716 may comprise one or more data cleaning or data preparation operations; for example, calculating one or more measurements based on raw sensor data. In accordance with certain aspects of the present disclosure, routine 700 may comprise one or more steps or operations for analyzing the follow-up data and the baseline data (e.g., pursuant to an output of Step 716) to determine a quantitative measure and/or qualitative degree of efficacy for the lymphedema compression sleeve apparatus and/or quantitative and/or qualitative measure of change in lymphedema symptoms for the user (Step 718). For example, if an analysis of the follow-up data shows that the circumference of the user's wrist decreased compared to the baseline data, then Step 718 may be configured to output a positive degree of efficacy for the lymphedema compression sleeve apparatus. Step 718 may be further configured to output a quantitative measure of change in the lymphedema symptoms for the user; for example, expressed as a percentage reduction in the circumference of the user's wrist. In accordance with certain aspects of the present disclosure, routine 700 may be configured to further process one or more outputs of Step 718 to generate one or more recommendations for the user and/or modify one or more operational modes or settings for the controller of the lymphedema compression sleeve apparatus (Step 720). In certain embodiments, Step 720 may comprise one or more steps or operations for communicating the one or more recommendations to the user interface of the mobile application (e.g., via the mobile device). In certain embodiments, Step 720 may comprise one or more steps or operations for automatically modifying one or more operational modes or settings at the controller. In accordance with certain embodiments, the one or more recommendations may comprise recommendations for modifying or configuring at least one treatment protocol for the user. For example, if an output of step 718 suggests that the user's symptoms have not improved over the baseline data, the one or more recommendations may comprise recommendations for increasing the pressure or duration of treatment for the lymphedema compression sleeve apparatus and/or modifying a sequence of operation for the motor units.

Figure 8A:
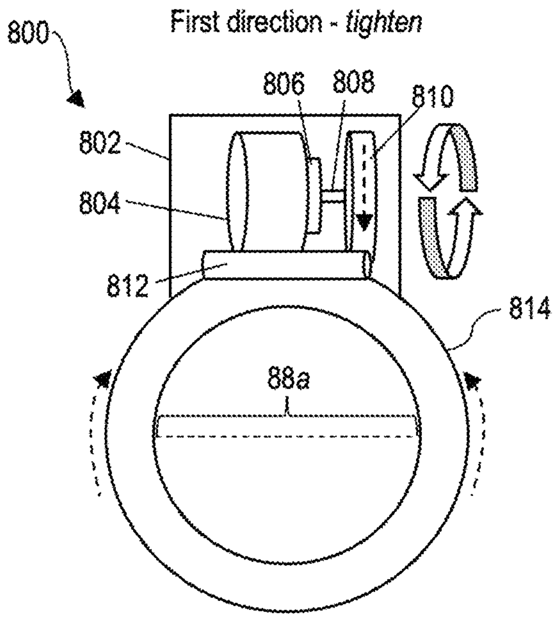
FIGS. 8A-8B are functional diagrams of an alternative embodiment of a motor unit of the lymphedema compression sleeve apparatus, in accordance with certain aspects of the present disclosure.
Figure 8B:
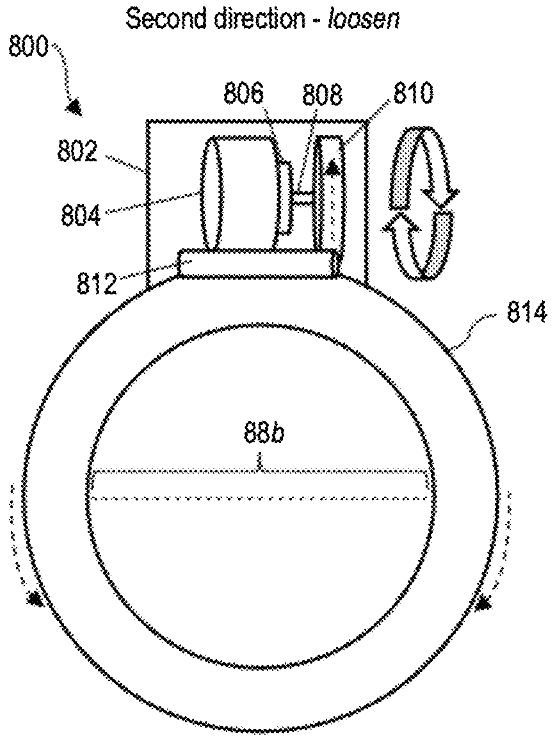

Referring now to FIGS. 8A-8B, with cross-reference to FIG. 1, functional diagrams of a motor unit 800 are shown. In accordance with certain aspects of the present disclosure, motor unit 800 comprises an alternative embodiment of motor unit 104*n* of the lymphedema compression sleeve apparatus 100 (as shown in FIG. 1). In accordance with the alternative embodiment illustrated in FIGS. 8A-8B, motor unit 104*n* may be operably engaged with a band 814. In accordance with certain aspects of the present disclosure, band 814 comprises an alternative embodiment of filament 106*n* (as shown in FIG. 1). Band 814 may be constructed of a metal or plastic material and may comprise a width in the range of about ¼ inch to 2 inches (although other widths are anticipated). In accordance with certain aspects of the present disclosure, the width of band 814 is configured to distribute the pressure generated via the mechanical interface with motor unit 800 over a wider area (i.e., as compared to filament 106*n* as shown in FIG. 1). In accordance with certain aspects of the present disclosure, motor unit 800 comprise a housing 802, an electronic DC motor 804, a (optional) sensor 806, a shaft 808, a gear 810, and a tightening means 812. In accordance with certain aspects of the present disclosure, motor 804 is configured to turn shaft 808 in order to rotate gear 810 (e.g., in a first direction and a second direction). Gear 810 is configured to drive the tightening means 812 in order to tighten and loosen band 814. In certain embodiments, tightening means 812 may comprise a worm gear configured to laterally displace band 814 in order to loosen and tighten band 814. In accordance with certain aspects of the present disclosure, motor unit 800 is configured to tighten band 814 to define a loop comprising a first radius 88*a* in response to engaging motor 804 in a first direction. In accordance with said aspects of the present disclosure, motor unit 800 is configured to loosen band 814 to define a loop comprising a second radius 88*b* in response to engaging motor 804 in a second direction.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top, "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. A compression sleeve apparatus comprising:

a sleeve comprising a fabric material, the sleeve being configured to be worn on an extremity of a user's body;

a plurality of motors disposed along a length of the sleeve between a first end and a second end of the sleeve, wherein each motor in the plurality of motors comprises a bi-directional direct current (DC) motor;

a plurality of filaments disposed around a circumference of the sleeve, wherein each filament in the plurality of filaments is concealed between a first surface of the sleeve and a second surface of the sleeve such that each filament in the plurality of filaments is concealed from view and is separated from a surface of the user's skin when the sleeve is worn by the user, wherein each filament in the plurality of filaments is individually coupled to a shaft of each motor in the plurality of motors, wherein each motor in the plurality of motors is configured to wind each filament around an axis of the shaft when each motor in the plurality of motors is engaged in a first direction and unwind each filament from around the axis of the shaft when each motor in the plurality of motors is engaged in a second direction, wherein each filament in the plurality of filaments is configured to define a loop when coupled to the shaft of each motor in the plurality of motors;

a controller operably engaged with the plurality of motors via at least one bus, wherein the controller is operably configured to selectively engage each motor in the plurality of motors in the first direction and the second direction; and a power source operably engaged with the controller and the plurality of motors to provide a flow of power to the controller and the plurality of motors, wherein the controller is operably configured to engage each motor in the plurality of motors in a sequence, wherein the sequence comprises a peristaltic wave sequence between the first end of the sleeve and the second end of the sleeve, wherein the controller is operably configured to independently engage each motor in the plurality of motors according to a different operational parameter such that a first motor in the plurality of motors is engaged according to a first pressure setting and a second motor in the plurality of motors is engaged according to a second pressure setting, wherein the controller is configured to concurrently engage the first motor according to the first pressure setting and the second motor according to the second pressure setting.

2. The compression sleeve apparatus of claim 1 wherein the controller is operably configured to engage the first motor according to the first pressure setting and the second motor according to the second pressure setting concurrently with the peristaltic wave sequence.

3. The compression sleeve apparatus of claim 1 wherein the controller is operably configured to selectively engage each motor in the plurality of motors according to two or more pressure controls for winding each filament in the plurality of filaments around the axis of the shaft.

4. The compression sleeve apparatus of claim 3 further comprising a plurality of pressure sensors communicably engaged with the controller to provide at least one pressure measurement for the plurality of filaments.

5. The compression sleeve apparatus of claim 1 wherein each filament in the plurality of filaments is configured to apply radial pressure to the first surface of the sleeve or the second surface of the sleeve in response to being wound around the axis of the shaft.

6. The compression sleeve apparatus of claim 5 wherein each filament in the plurality of filaments is configured to release the radial pressure from the first surface of the sleeve or the second surface of the sleeve in response to being unwound from around the axis of the shaft.

7. A compression sleeve apparatus comprising:

a sleeve comprising a fabric material, the sleeve being configured to be worn on an extremity of a user's body;

a plurality of motors disposed along a length of the sleeve between a first end and a second end of the sleeve, wherein each motor in the plurality of motors comprises a bi-directional direct current (DC) motor;

a plurality of filaments disposed around a circumference of the sleeve, wherein each filament in the plurality of filaments is concealed between a first surface of the sleeve and a second surface of the sleeve such that each filament in the plurality of filaments is concealed from view and is separated from a surface of the user's skin when the sleeve is worn by the user, wherein each filament in the plurality of filaments is individually coupled to a shaft of each motor in the plurality of motors, wherein each motor in the plurality of motors is configured to wind each filament around an axis of the shaft when each motor in the plurality of motors is engaged in a first direction and unwind each filament from around the axis of the shaft when each motor in the plurality of motors is engaged in a second direction, wherein each filament in the plurality of filaments is configured to define a loop when coupled to the shaft of each motor in the plurality of motors;

a controller operably engaged with the plurality of motors via at least one bus, wherein the controller is operably configured to selectively engage each motor in the plurality of motors in the first direction and the second direction;

a power source operably engaged with the controller and the plurality of motors to provide a flow of power to the controller and the plurality of motors; and a user interface operably engaged with the controller, wherein the user interface is configured to command one or more operational modes of the controller, wherein the controller is operably configured to selectively engage each motor in the plurality of motors in a sequence, wherein the sequence comprises a peristaltic wave sequence between the first end of the sleeve and the second end of the sleeve, wherein the controller is operably configured to independently engage each motor in the plurality of motors according to a different operational parameter such that a first motor in the plurality of motors is engaged according to a first pressure setting and a second motor in the plurality of motors is engaged according to a second pressure setting, wherein the controller is configured to concurrently engage the first motor according to the first pressure setting and the second motor according to the second pressure setting.

8. The compression sleeve apparatus of claim 7 wherein the controller is operably configured to engage the first motor according to the first pressure setting and the second motor according to the second pressure setting concurrently with the peristaltic wave sequence.

9. The compression sleeve apparatus of claim 8 further comprising a plurality of pressure sensors communicably engaged with the controller to provide at least one pressure measurement for the plurality of filaments.

10. The compression sleeve apparatus of claim 9 wherein each filament in the plurality of filaments is configured to apply radial pressure to the first surface of the sleeve or the second surface of the sleeve in response to being wound around the axis of the shaft.

11. The compression sleeve apparatus of claim 10 wherein each filament in the plurality of filaments is configured to release the radial pressure from the first surface of the sleeve or the second surface of the sleeve in response to being unwound from around the axis of the shaft.

12. A compression sleeve system comprising:

a compression sleeve apparatus, wherein the compression sleeve apparatus comprises:

a sleeve comprising a fabric material, the sleeve being configured to be worn on an extremity of a user's body;

a plurality of motors disposed along a length of the sleeve between a first end and a second end of the sleeve, wherein each motor in the plurality of motors comprises a bi-directional direct current (DC) motor;

a plurality of filaments disposed around a circumference of the sleeve, wherein each filament in the plurality of filaments is concealed between a first surface of the sleeve and a second surface of the sleeve such that each filament in the plurality of filaments is concealed from view and is separated from a surface of the user's skin when the sleeve is worn by the user, wherein each filament in the plurality of filaments is individually coupled to a shaft of each motor in the plurality of motors, wherein each motor in the plurality of motors is configured to wind each filament around an axis of a shaft when each motor in the plurality of motors is engaged in a first direction and unwind each filament from around the axis of the shaft when each motor in the plurality of motors is engaged in a second direction, wherein each filament in the plurality of filaments is configured to define a loop when coupled to the shaft of each motor in the plurality of motors;

a controller operably engaged with the plurality of motors via at least one bus, wherein the controller is operably configured to selectively engage each motor in the plurality of motors in the first direction and the second direction; and a power source operably engaged with the controller and the plurality of motors to provide a flow of power to the controller and the plurality of motors; and an external electronic device communicably engaged with the controller of the compression sleeve apparatus via a wireless communications interface, wherein the external electronic device comprises a user interface for commanding one or more operational modes of the controller, wherein the controller is operably configured to selectively engage each motor in the plurality of motors in a sequence, wherein the sequence comprises a peristaltic wave sequence between the first end of the sleeve and the second end of the sleeve, wherein the controller is operably configured to independently engage each motor in the plurality of motors according to a different operational parameter such that a first motor in the plurality of motors is engaged according to a first pressure setting and a second motor in the plurality of motors is engaged according to a second pressure setting, wherein the controller is configured to concurrently engage the first motor according to the first pressure setting and the second motor according to the second pressure setting.

13. The compression sleeve system of claim 12 wherein the controller is operably configured to engage the first motor according to the first pressure setting and the second motor according to the second pressure setting concurrently with the peristaltic wave sequence.

14. The compression sleeve system of claim 12 wherein the one or more operational modes of the controller comprise one or more timing parameters for engaging each motor in the plurality of motors.

15. The compression sleeve system of claim 12 wherein the controller is configured to communicate real-time activity data for the compression sleeve apparatus to the external electronic device via the wireless communications interface, wherein the external electronic device is configured to display the real-time activity data at the user interface.

* * * * *